UNITED STATES PATENT OFFICE.

CORNELIUS M. MOORE, OF DAHLONEGA, GEORGIA.

FIRE AND WATER PROOF PAINT AND CEMENT.

SPECIFICATION forming part of Letters Patent No. 507,745, dated October 31, 1893.

Application filed July 21, 1893. Serial No. 481,116. (No specimens.)

*To all whom it may concern:*

Be it known that I, CORNELIUS M. MOORE, a citizen of the United States, residing at Dahlonega, in the county of Lumpkin, State of Georgia, have invented a new and useful Composition of Matter, to wit: a Fire and Water Proof Paint and Cement, of which the following is a specification.

My composition consists of the following ingredients, combined in the proportions, stated, viz: three pints of brick bat clay, finely pulverized; two pints of hard wood ashes, (oak, ash or hickory;) one pint of fine sand; one ounce of common salt; one ounce of alum. Mix to any desired consistency for paint or cement with linseed oil. The whole should be well stirred together, and is ready for use as soon as made.

I have arrived at the specific proportions by oft repeated experiments and tests. The clay used is what is well known in the mineral or gold region of North Georgia as "brickbat clay," found lying parallel with the gold ores of this section. By some it is termed a slate, by others a shale; a hard substance, friable and easily crushed, but will not break in straight lines. I am not aware that this ingredient has ever entered into the manufacture of paint or cement.

What I claim, and desire to secure by Letters Patent of the United States, is—

The herein described composition of matter to be used as a paint or cement, consisting of brick-bat clay, finely pulverized, hard wood ashes, fine sand, common salt, alum, and linseed oil, in the proportions set forth and for the purposes described.

CORNELIUS M. MOORE.

Witnesses:
JOHN WHECHEL,
J. C. WILLIAMS.